(12) United States Patent
Kim et al.

(10) Patent No.: US 11,413,764 B2
(45) Date of Patent: Aug. 16, 2022

(54) SERVING ROBOT AND METHOD FOR RECEIVING CUSTOMER USING THE SAME

(71) Applicant: LG ELECTRONICS INC., Seoul (KR)

(72) Inventors: Hyongguk Kim, Seoul (KR); Jaeyoung Kim, Seoul (KR); Hyoungmi Kim, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 340 days.

(21) Appl. No.: 16/488,797

(22) PCT Filed: Jun. 7, 2019

(86) PCT No.: PCT/KR2019/006864
§ 371 (c)(1),
(2) Date: Aug. 26, 2019

(87) PCT Pub. No.: WO2020/246643
PCT Pub. Date: Dec. 10, 2020

(65) Prior Publication Data
US 2021/0354305 A1    Nov. 18, 2021

(51) Int. Cl.
*G05B 15/00* (2006.01)
*G05B 19/00* (2006.01)
*B25J 11/00* (2006.01)
*B25J 9/16* (2006.01)
*B25J 13/00* (2006.01)
(Continued)

(52) U.S. Cl.
CPC ........... *B25J 11/0005* (2013.01); *B25J 9/161* (2013.01); *B25J 11/0045* (2013.01);
(Continued)

(58) Field of Classification Search
CPC .... B25J 11/0005; B25J 9/161; B25J 11/0045; B25J 13/003; B25J 13/08; B25J 19/023;
(Continued)

(56) References Cited

U.S. PATENT DOCUMENTS 10,769,200 B1 * 9/2020 Lin ..................... G06F 16/2455
2003/0208409 A1 * 11/2003 Mault ................. G06Q 30/0639
705/15
(Continued)

FOREIGN PATENT DOCUMENTS

CN          102699895       10/2012
KR     10-2008-0008528       1/2008
(Continued)

OTHER PUBLICATIONS

International Search Report dated Mar. 4, 2020 issued in Application No. PCT/KR2019/006864.

*Primary Examiner* — Harry Y Oh
(74) *Attorney, Agent, or Firm* — Ked & Associates, LLP

(57) ABSTRACT

A serving robot includes a camera to obtain image data including at least one of a facial expression or a gesture, which is associated with food, of a customer, a microphone to obtain voice data including voice of the customer, which is associated with the food and a processor to obtain customer reaction data including at least one of the image data or the voice data, through at least one of the camera or the microphone, estimate a reaction of the customer to the food, from the obtained customer reaction data, and generate or update customer management information corresponding to the customer based on the estimated reaction. The robot estimates the reaction the customer from the customer reaction data through the learning model based on artificial intelligence.

18 Claims, 11 Drawing Sheets

(51) Int. Cl.
*B25J 13/08* (2006.01)
*B25J 19/02* (2006.01)
*G06V 40/20* (2022.01)
*G06V 40/16* (2022.01)

(52) U.S. Cl.
CPC ............. *B25J 13/003* (2013.01); *B25J 13/08* (2013.01); *B25J 19/023* (2013.01); *B25J 19/026* (2013.01); *G06V 40/174* (2022.01); *G06V 40/20* (2022.01)

(58) Field of Classification Search
CPC ............... B25J 19/026; G06K 9/00302; G06K 9/00335
See application file for complete search history.

(56) References Cited

U.S. PATENT DOCUMENTS

| | | | |
|---|---|---|---|
| 2018/0032701 A1* | 2/2018 | Zatvan | G16H 40/63 |
| 2018/0136615 A1 | 5/2018 | Kim et al. | |
| 2018/0165655 A1* | 6/2018 | Marcelle | G06Q 10/1095 |
| 2018/0285752 A1* | 10/2018 | Yu | G10L 13/00 |
| 2019/0156399 A1* | 5/2019 | Greenberger | G06Q 30/0635 |
| 2019/0270204 A1* | 9/2019 | Kawamura | B25J 11/008 |
| 2019/0272580 A1* | 9/2019 | Kawamura | H04N 5/23299 |
| 2019/0278467 A1* | 9/2019 | Kim | G07C 5/0816 |
| 2020/0034916 A1* | 1/2020 | He | G06Q 30/0635 |
| 2020/0245795 A1* | 8/2020 | Van Ee | B25J 11/008 |
| 2020/0349948 A1* | 11/2020 | Ihara | G10L 17/22 |
| 2020/0387912 A1* | 12/2020 | Allen | G06K 9/00288 |

FOREIGN PATENT DOCUMENTS

| | | |
|---|---|---|
| KR | 20080074768 A * | 8/2008 |
| KR | 10-2010-0110143 | 10/2010 |
| KR | 10-2011-0004015 | 1/2011 |
| KR | 10-1854431 | 5/2018 |

\* cited by examiner

SERVING ROBOT AND METHOD FOR RECEIVING CUSTOMER USING THE SAME

CROSS-REFERENCE TO RELATED PATENT APPLICATIONS

This application is a U.S. National Stage Application under 35 U.S.C. § 371 of PCT Application No. PCT/KR2019/006864, filed Jun. 7, 2019, whose entire disclosures are hereby incorporated by reference.

FIELD

The present invention relates to a serving robot, and more particularly to a serving robot disposed in a restaurant to provide various services to a customer and a method for receiving a customer using the same.

BACKGROUND

A robot is a machine which automatically processes a given task through the intrinsic ability thereof or which automatically operates, and application fields of the robot is classified into various fields such as an industrial field, a medical field, a space field, or a seabed field.

Recently, the functions of the robot have been expanded as a self-driving technology, an automatic control technology using a sensor, or a communication technology has been developed. For example, robots arranged in shops such as restaurants or cafés have been introduced. Such a robot may include a cooking robot that directly cooks food or assists the cooking process of a cook, and a serving robot that replaces or assists the waiter. For example, the serving robot may travel in a shop, process an order request of a customer, or provide services such as carrying food or drinks to a customer.

Meanwhile, manners of additionally utilizing the serving robot have been studied and developed in addition to the processing of the order request and the carrying of food or drinks.

Recently, as the interest rate and the knowledge of people on food have been increased, the tastes and the preferences of customers visiting shops have been diversified, and the demand of the customer has been increased. In addition, some customers demand a cook to perform cooking of by reflecting the tastes or preferences of the customers through the communication with the cook. In other words, there is necessary to provide differentiated and customized services with respect to customers.

In addition, a manger of a shop or a cook of the shop attempts to improve the quality of foods by monitoring the reactions of customers to the foods, which are provided, or obtaining the evaluation of the foods. However, it is not easy for the manager or the cook to personally monitor the reactions of several customers and to obtain the exact evaluation of the foods from the customers.

SUMMARY

The present invention is to implement a serving robot for providing a customized or differentiated service to a customer using a shop such as a restaurant.

The present invention is to provide a serving root for effectively making communication between a customer and a kitchen.

According to one aspect of the present invention, there is provided a serving robot including a camera to obtain image data including at least one of a facial expression or a gesture, which is associated with food, of a customer, a microphone to obtain voice data including voice of the customer, which is associated with the food, and a processor to obtain customer reaction data including at least one of the image data or the voice data, through at least one of the camera or the microphone, to estimate a reaction of the customer to the food, from the obtained customer reaction data, and to generate or update customer management information corresponding to the customer based on the estimated reaction.

The processor may recognize emotion of the customer based on the at least one of the facial expression or the gesture of the customer included in the image data, and estimate the reaction of the customer to the food, based on the recognized emotion.

According to an embodiment, the serving robot may further include a memory to store a learning model learned by a learning processor, and the processor may estimate the reaction of the customer from the customer reaction data, through the learning model stored in the memory.

According to an embodiment, the serving robot may further include a communication unit to connect with a server, and the processor may control the communication unit to transmit the customer reaction data to the server, and receive, from the server, information on the reaction of the customer based on the customer reaction data.

According to an embodiment, the serving robot may be connected with a kitchen communication device disposed in a kitchen, and the processor may control the communication unit to transmit at least one of the customer reaction data, information on the estimated reaction, or voice data including a request or an inquiry associated with food, which is obtained from the customer, to the kitchen communication device.

The serving robot may further include at least one of a display and a speaker, and the processor may receive response data including at least one of image data or voice data from the kitchen communication device, and control at least one of the display and the speaker to output the received response data.

The processor may obtain customer feature data including at least one of image data including a face of the customer or voice data including a voice of the customer, through at least one of the camera or the microphone, identify the customer based on the obtained customer feature data, and obtain customer management information corresponding to the customer, from a database.

According to an embodiment, the customer management information may include at least one item of a name of the customer, a visit history, an ordered food history, allergy or dislike food ingredient, preferred taste, hate taste, or a favorite food menu.

The processor may update at least one of the allergy or dislike food ingredient, the preferred taste, the hate taste, or the favorite food menu, which is the item of the customer management information, based on the estimated reaction.

According to an embodiment, the processor may obtain order information from the customer, based on the customer management information, and transmit the obtained order information to the server or the kitchen communication device.

According to an embodiment, the processor may receive expected cooking time information for the order information from the server or the kitchen communication device, and output the received expected cooking time information through at least one of a display or a speaker.

According to an embodiment, the processor may register the order information from the customer in an order list including order information of at least one of another customer, may generate expected cooking time information for the order information, based on the order list, and may output the generated expected cooking time information through at least one of a display or a speaker.

According to an embodiment of the present invention a method for receiving a customer using a serving robot, includes obtaining customer reaction data associated with food, estimating a reaction of the customer to the food, from the obtained customer reaction data, and updating customer management information corresponding to the customer based on the estimated reaction. The customer reaction data may include at least one of image data including at least one of the facial expression or the gesture, which is associated with the food, of the customer, or voice data including a voice of the customer, which is associated with the food.

DETAILED DESCRIPTION

Figure 1:
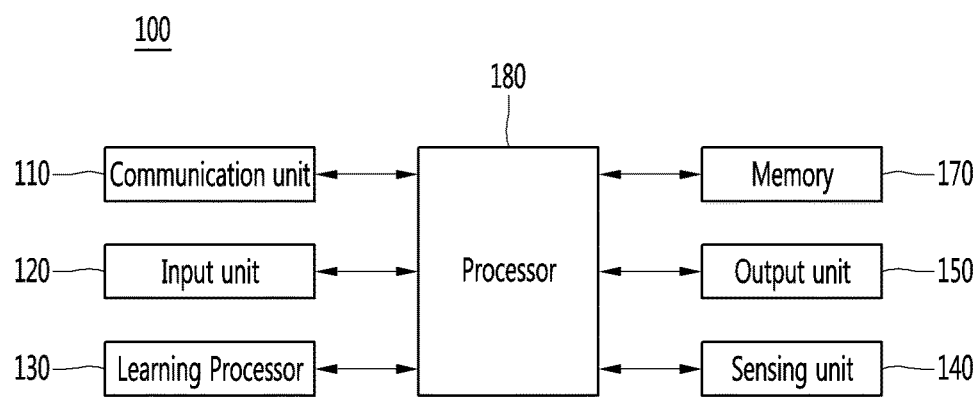
FIG. 1 illustrates an AI device according to an embodiment of the present invention.

Hereinafter, embodiments disclosed herein will be described with reference to accompanying drawings. Accordingly, those of ordinary skill in the art will recognize that modification, equivalent, and/or alternative on the various embodiments described herein can be variously made without departing from the scope and spirit of the disclosure.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
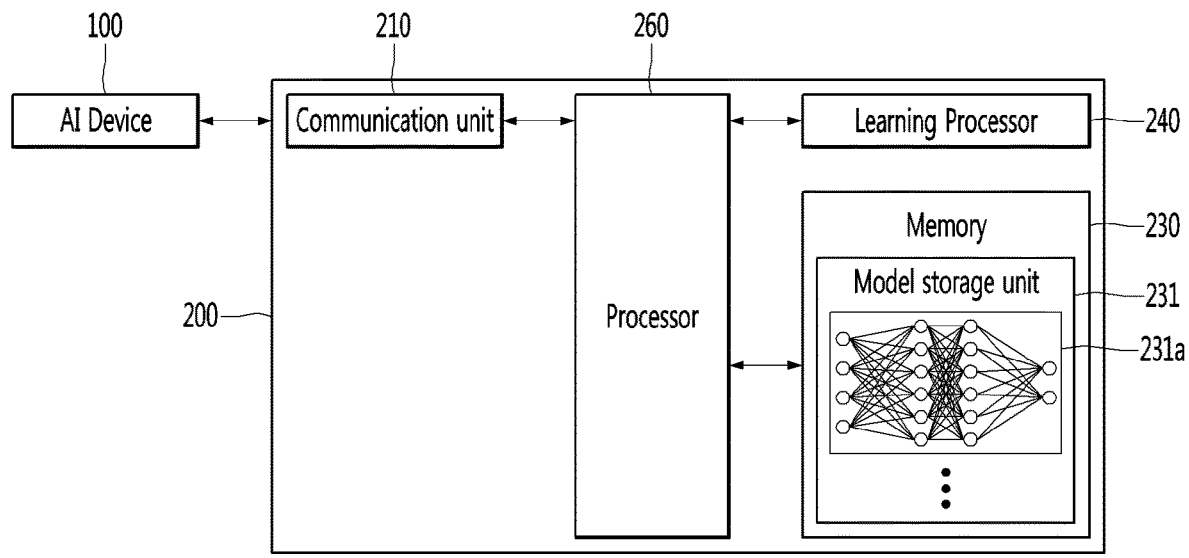
FIG. 2 illustrates an AI server according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
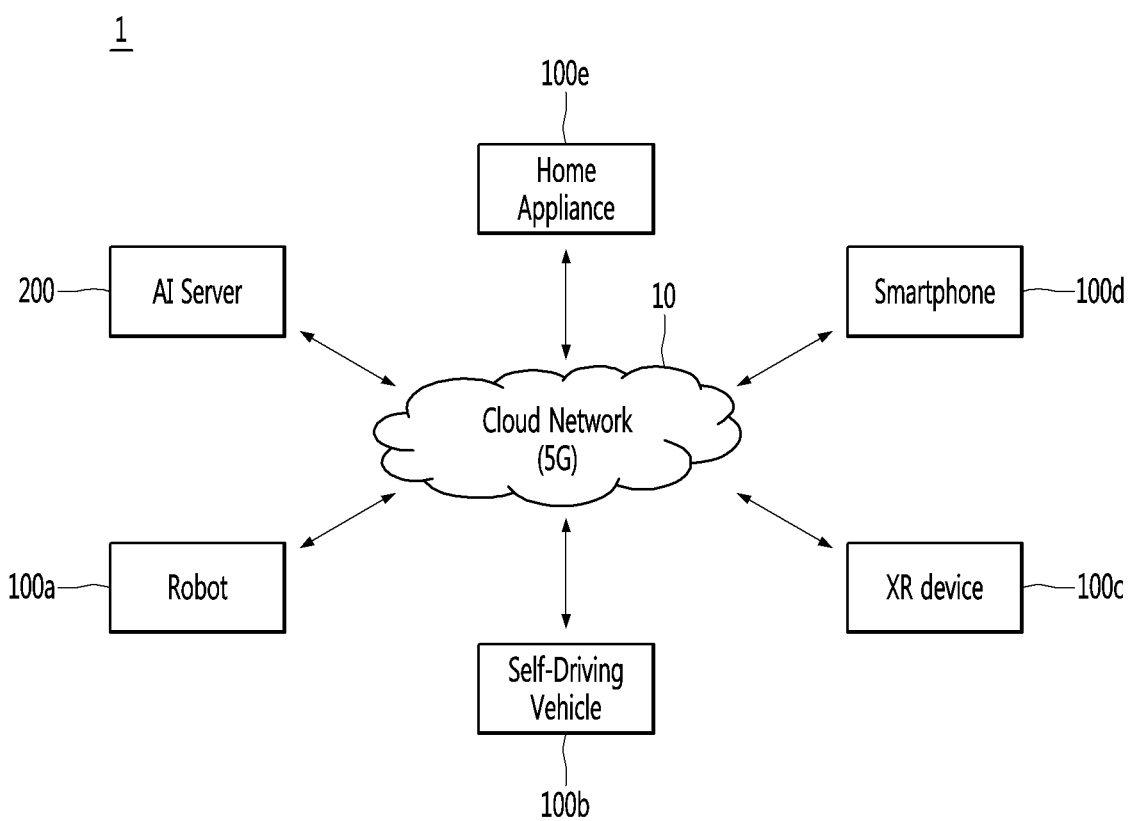
FIG. 3 illustrates an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/ interaction of the user. At this time, the robot 100a may acquire the intention information of the interaction due to the user's operation or speech utterance, and may determine the response based on the acquired intention information, and may perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Figure 4:
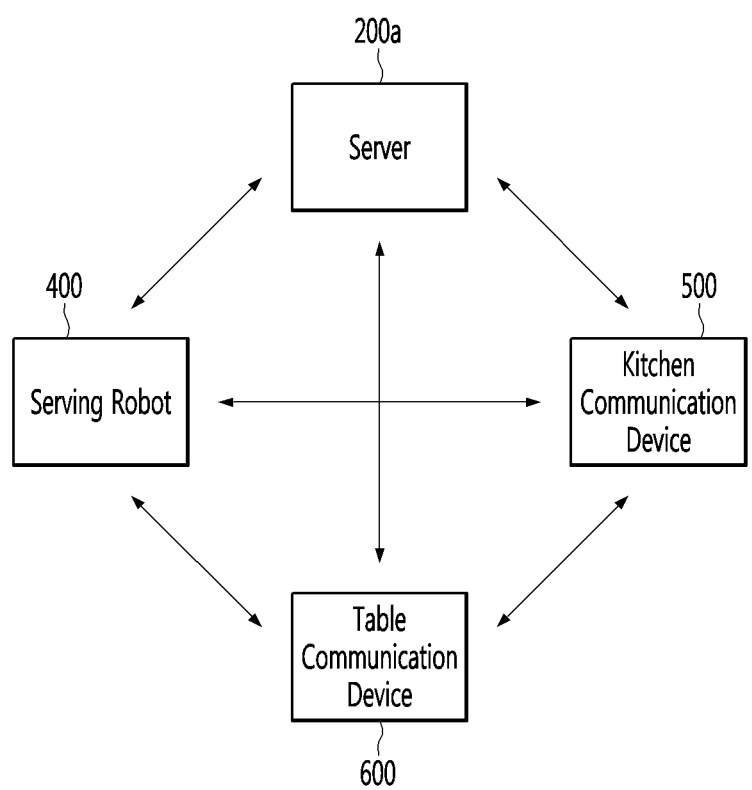
FIG. 4 is a schematic view of a serving system according to an embodiment of the present invention.

FIG. 4 is a schematic view of a serving robot and a serving system including the same according to an embodiment of the present invention.

Hereinafter, in the present specification, a situation applied to a restaurant in which a serving robot and a serving system provide foods will be described by way of example.

However, according to an embodiment of the present invention, the serving robot and the serving system may be similarly applied to a shop (café) providing a similar service as well as a restaurant.

Referring to FIG. 4, the serving system may include a serving robot 400, a server 200a, and a kitchen communication device 500.

The serving robot 400 may be arranged in a hall of a shop to travel through the hall to provide various services to the customer. For example, the serving robot 400 may process an order request or payment of a customer. In addition, the serving robot 400 may deliver the food prepared in the kitchen to the customer.

In addition, the serving robot 400 may provide customized and differentiated services to a customer by identifying the customer based on the features (face, or voice) of the customer.

In addition, the serving robot 400 may monitor and estimate the reactions of customers, approach a customer, a specific reaction of who is detected, and may provide an appropriate service to the customer.

The server 200a may perform the overall operation and overall management of the serving system. For example, the server 200a may be a server operated by a provider of the serving system, but may include a computing device disposed in the shop according to an embodiment.

The server 200a is connected with the serving robot 400 and the kitchen communication device 500 to obtain various pieces of information and data. Meanwhile, the serving robot 400 and the kitchen communication device 500 may make communication with each other through the server 200a, but may directly make communication with each other according to an embodiment.

The server 200a may include a database to manage customers who have visited the shop. The database may store customer management information on each of the customers. The database may be provided in the serving robot 400 according to an embodiment.

Regarding the above-described customer identification operation and the customer reaction estimation operation, the serving robot 400 may obtain only data for customer identification and customer reaction estimation, and the actual customer identification operation and the customer reaction estimation operation may be performed in the server 200a. In this case, algorithms or program data for customer identification, and algorithm or program data for customer reaction estimation may be stored in server 200a and/or serving robot 400.

The kitchen communication device 500 may include various electronic devices disposed in a kitchen or held by or wearable on a cook. For example, the kitchen communication device 500 may include various electronic devices such as a smart phone, a tablet PC, a headset device, and a smart watch.

For example, the kitchen communication device 500 outputs order information obtained by the serving robot 400, thereby allowing the cook to perform cooking of food included in the order information.

In addition, the serving robot 400 and the kitchen communication device 500 allow communication between the customer and the kitchen (cook). For example, each of the serving robot 400 and the kitchen communication device 500 may include a camera, a display, a microphone, and/or a speaker to allow communication between a customer and a cook.

According to an embodiment, the serving system may further include a table communication device 600 provided in each of tables disposed in a hall of the shop. For example, the table communication device 600 may be implemented with an electronic device having a display, a microphone, and a speaker.

The table communication device 600 may provide some functions, for example, a function of receiving an order request, a function of processing the order request, and a payment function, which is provided by the serving robot 400. According to the embodiment, the table communication device 600 includes a button for calling the serving robot 400, thereby allowing the customer to easily call the serving robot 400 if necessary.

In addition, the serving system may provide various types of services to a customer. Examples of services provided by the serving robot and the serving system according to the embodiment of the present invention will be described later with reference to FIG. 6 to FIG. 14.

Figure 5:
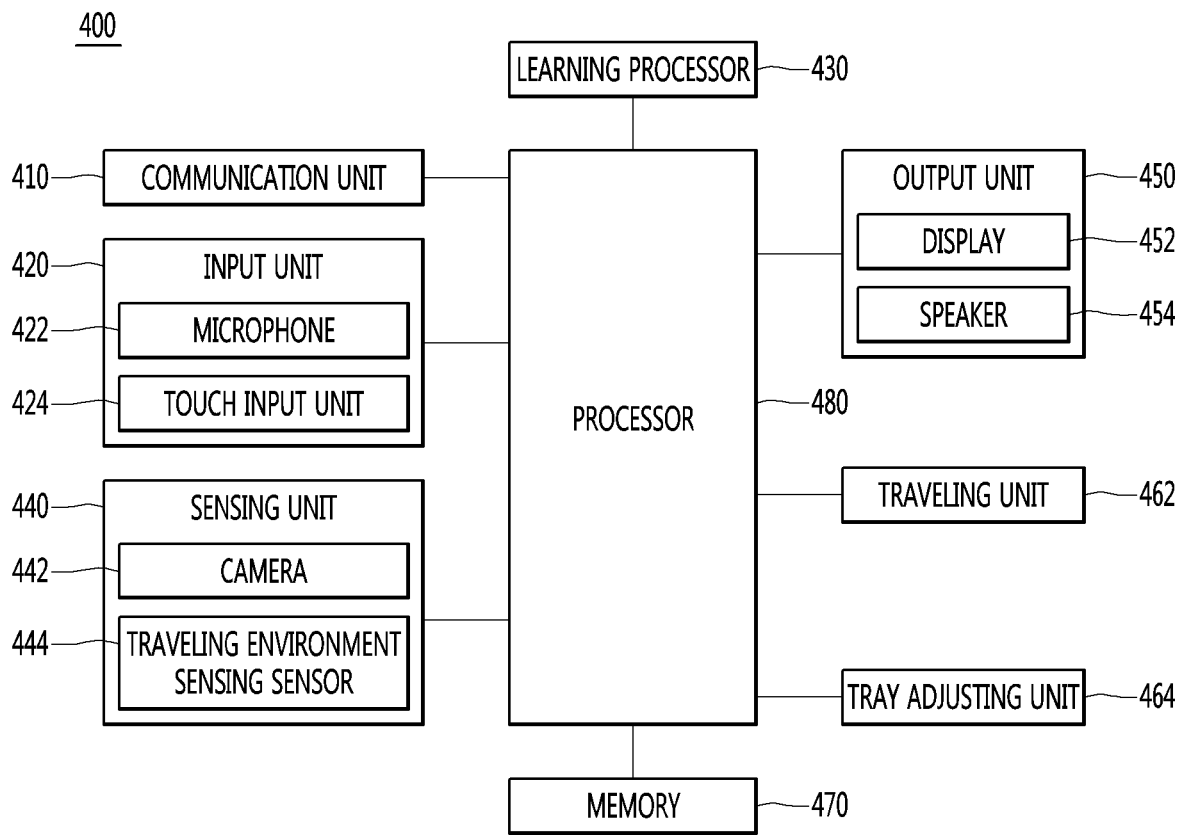
FIG. 5 is a block diagram illustrating control components of a serving robot according to an embodiment of the present invention.

FIG. 5 is a block diagram illustrating control components of a serving robot according to an embodiment of the present invention.

Referring to FIG. 5, the serving robot 400 according to an exemplary embodiment of the present invention may include a communication unit 410, an input unit 420, a sensing unit 440, an output unit 450, a traveling unit 462, a memory 470, and a processor 480. The components illustrated in FIG. 5 are examples for convenience of description, and the serving robot 400 may include more or fewer components than those illustrated in FIG. 5.

Meanwhile, the serving robot 400 may correspond to an example of the AI device 100 described above with reference to FIG. 1. In this case, the content of each of the above-described components in FIG. 1 may be similarly applied to each of the corresponding ones of the components of the serving robot 400.

The communication unit 410 includes communication modules for connecting the serving robot 400 with the server 200a, the kitchen communication device 500, the table communication device 600, a mobile terminal, and another robot. Each of the communication modules may support any of the communication technologies described above in FIG. 1.

For example, the serving robot 400 may be connected with a network through an access point such as a router. Accordingly, the serving robot 400 provides various pieces of information and/or data, which is obtained through the input unit 420 and the sensing unit 440 to the server 200a or the kitchen communication device 500 through the network.

The input unit 420 may include at least one input means to obtain various types of data. For example, the at least one input means may include a physical input means such as a button or a dial, a microphone 422 to receive a voice of a user (e.g., a customer) or a sound around the serving robot 400, a touch input unit 424 such as a touch pad or a touch panel. The user may input various requests and commands to the serving robot 400 through the input unit 420.

The sensing unit 440 may include at least one sensor to sense various pieces of information around the serving robot 400. For example, the sensing unit 440 may include a camera 442 and a traveling environment sensing sensor 444.

The camera 442 may obtain an image around the serving robot 400. The processor 480 may control the camera 442 to obtain an image including a customer, a table, or a food.

The processor 480 may obtain image data including the face of the customer through the camera 442, and may identify the customer based on the obtained image data. Alternatively, the processor 480 may transmit the obtained image data to the server 200a through the communication unit 410, and the server 200a may identify the customer based on the received image data.

According to the embodiment, the processor 480 or the server 200a may estimate the reaction of the customer to the food based on the facial expression or the gesture of the customer included in the obtained image data.

In this case, the processor 480 may obtain voice data including voice of the customer through the microphone 422, identify the customer using the obtained voice data, or estimate the reaction of the customer. In other words, the microphone 422 may serve as the sensing unit 440.

The server 200a may be implemented with the AI server 200 described above with reference to FIG. 2. In this case, the server 200a may receive a model (artificial neural network 231a) learned through the learning processor 240 to identify the customer from the image data and/or voice data or to estimate the reaction of the customer.

According to an embodiment, the processor 480 may identify a customer from the image data and/or voice data, or estimate the reaction of the customer through a model learned by a learning processor 430 in the serving robot 400. Alternatively, the processor 480 may receive data corresponding to the learned model from the server 200a, store the data in the memory 470, identify the customer from the image data and/or voice data based on stored data, or estimate the reaction of the customer.

The traveling environment sensing sensor 444 may include at least one sensor to sense an obstacle around the serving robot 400, on the floor surface, and a step on the floor surface for stable traveling of the serving robot 400. For example, the traveling environment sensing sensor 444 may include a camera, an ultrasonic sensor, or a proximity sensor.

The processor 480 may control the traveling direction and the traveling velocity of the serving robot 400 based on the sensing value of the traveling environment sensing sensor 444. For example, the processor 480 may sense an obstacle ahead based on the sensed value, set or change a traveling route based on the detected obstacle, and control the traveling unit 462 (e.g., a traveling motor) based on the set or changed traveling route.

The output unit 450 may output various pieces of information associated with the operation and state of the serving robot 400, various services, programs, and applications executed by the serving robot 400.

For example, the output unit 450 may include a display 452 and a speaker 454.

The display 452 may output various pieces of information and messages, which are described, in a graphic form. According to an embodiment, the display 452 may be implemented in the form of a touch screen together with the touch input unit 424. In this case, the display 452 may serve as an input means as well as an output means.

The speaker 454 may output various pieces of information or messages in the form of voice or sound.

According to an embodiment, the serving robot 400 may receive image data including a cook and/or voice data of the cook from the kitchen communication device 500 and transmit the received data to the display 452 and/or the speaker 454.

The traveling unit 462, which is used to move (travel) the serving robot 400, may include, for example, the traveling motor. The traveling motor may be connected with at least one wheel provided at a lower portion of the serving robot 400 to provide a driving force for traveling the serving robot 400 to the wheel. For example, the traveling unit 462 may include at least one traveling motor, and the processor 480 may control the at least one traveling motor to adjust the traveling direction and/or traveling velocity.

According to an embodiment, the serving robot 400 may include a tray adjusting unit 464. For example, the serving robot 400 may include at least one tray on which food is placed. The tray adjusting unit 464 may include a motor to adjust the height of each of the at least one tray. The processor 480 may control the tray adjusting unit 464 to adjust the height of any one of the at least one tray to correspond to the table and move the food, which is placed on the tray, to the table.

The memory 470 stores control data for controlling the operation of the components included in the serving robot 400, and various pieces of data to perform an operation based on an input obtained through the input unit 420, or based on information obtained through the sensing unit 440.

The memory 470 may also store program data of a software module or an application, which is executed by at least one processor included in the processor 480 or a controller.

Further, the memory 470 according to the embodiment of the present invention may an image recognition algorithm to identify a customer or to estimate the reaction of the customer based on image data including the customer obtained through the camera 442 and/or the voice data of the customer obtained through the microphone 422. The memory 470 may further store data for identification of the customer, and customer management information.

The memory 470 may store an algorithm to adjust the traveling velocity or the traveling direction based on the sensing value obtained through the travel environment sensing sensor 444.

The memory 470 may include various storage devices, such as a read only memory (ROM), a random access memory (RAM), an electrically erasable PROM (EEPROM), a flash drive, and a hard drive in hardware.

The processor 480 may include at least one processor or controller that controls the operation of the serving robot 400. In particular, the processor 480 may include at least one CPU, an application processor (AP), a microcomputer (or microcomputer), an integrated circuit, or an application specific integrated circuit (ASIC).

The processor 480 may control the overall operation of the components included in the serving robot 400. In addition, the processor 480 may include an image signal processor (ISP), which processes an image signal obtained through the camera 442 to generate image data, or a display controller which controls the operation of the display 452.

Hereinafter, the operation of the serving robot 400 and the serving system including the same according to the embodiment of the present invention will be described in detail with reference to FIG. 6 to FIG. 14.

Figure 6:
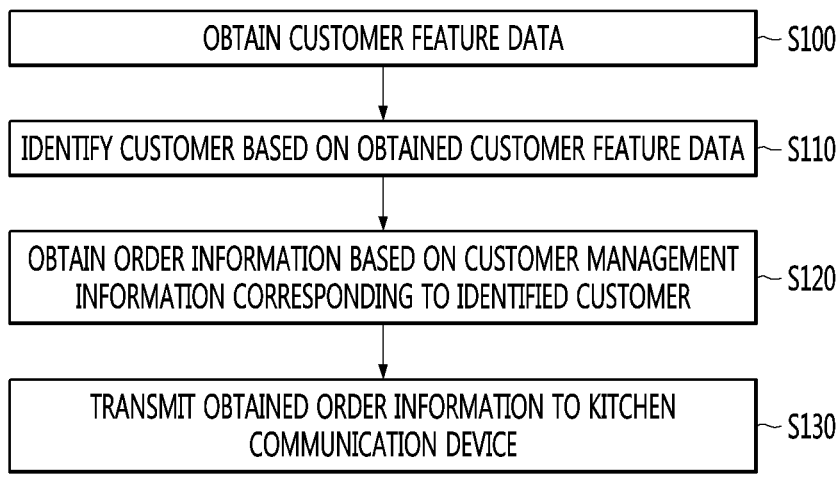
FIG. 6 is a flowchart illustrating a method for receiving a customer by the serving robot according to an embodiment of the present invention.

FIG. 6 is a flowchart illustrating an operation of receiving a customer by a serving robot according to an embodiment of the present invention.

Referring to FIG. 6, the serving robot 400 may obtain customer feature data (S100).

The customer feature data may include data indicating a unique feature of the customer, for example, image data including a customer (the face of the customer), and/or voice data including a voice of the customer.

In other words, the processor 480 of the serving robot 400 may obtain the image data including the customer using the camera 442 or voice data including the voice of the customer using the microphone 422.

For example, the processor 480 may obtain image data and/or voice data when the customer enters the shop.

According to an embodiment, the processor 480 may obtain the image data and/or voice data when the customer calls the serving robot 400 for ordering.

The serving robot 400 may identify the customer based on the obtained customer feature data (S110).

The processor 480 may identify the customer using the obtained customer feature data.

For example, the processor 480 may extract feature information for identifying a customer from the obtained image data using the image recognition algorithm. Alternatively, the processor 480 may extract feature information for identifying the customer from voice characteristics (such as frequency characteristics) included in the voice data obtained using a voice analysis algorithm.

The memory 170 may store the feature information on each of a plurality of customers and the processor 480 may identify the customer by matching the extracted feature information with the feature information stored in the memory 170.

According to an embodiment, the processor 480 may identify a customer based on the customer feature data using a learning model (e.g., an artificial neural network), which is learned by the learning processor 430 or learned and provided from the server 200*a*. The learning model may be stored in the memory 170.

Meanwhile, when the customer first visits the shop, the feature information associated with the customer may be absent or learned data for the customer may be absent. In this case, the processor 480 may recognize that the customer first visits the shop because the identification of the customer is failed.

The serving robot 400 may obtain order information from the customer based on the customer management information corresponding to the identified customer (S120).

The processor 480 may obtain the customer management information of the identified customer from the customer management information of each of a plurality of customers stored in the database. For example, the database may be stored in the memory 470, may be stored in the server 200*a* connected with the serving robot 400 or may be stored in a separate database server.

The customer management information may include various pieces of information associated with the customer who have visited the shop. For example, the customer management information may include information on various items such as the name, a visit history, a recent visit date, an order history, a favorite menu, an allergy or dislike food ingredient, a preferred taste, or a hate taste of the customer.

Information on each of the items may be input directly from the customer, or may be obtained automatically by the serving robot 400. For example, the processor 480 may obtain information on the favorite menu, the preferred taste, the haste taste, the allergy or dislike food ingredient, based on an order history of the customer, and the reaction of the customer to food.

The processor 480 may obtain order information from the customer based on the obtained customer management information.

For example, the processor 480 may provide the customer with at least one menu recommend based on at least one piece of information of the order history, the favorite menu, the allergy or dislike food ingredient, the preferred taste, and the hate taste contained in the customer management information.

The customer may select one or two or more of the at least one recommended menu, based on the information on the at least one recommended menu provided from the serving robot 400, or may select another menu which is not included in the at least one recommended menu. The processor 480 may obtain order information including at least one food, based on the menu selected by the customer.

The serving robot 400 may transmit the obtained order information to the kitchen communication device 500 (S130).

The processor 480 may transmit the order information to the kitchen communication device 500 to allow a cook present in a kitchen to perform the cooking of the food included in the order information. The kitchen communication device 500 may output the received order information through an output means such as a display. The cook present in the kitchen may cook the food included in the order information by identifying the output order information.

According to an embodiment, the processor 480 may transmit the order information to the server 200*a*, and the server 200*a* may register the order information in the order list of the shop. The order list may include order information of each of at least one customer.

The server 200*a* transmits the order list to the kitchen communication device 500 and the kitchen communication device 500 outputs the received order list to allow the cook to identify at least one pieces of order information included in the order list.

According to the embodiment, the kitchen communication device 500 may obtain expected cooking time information of a food, which is included in the order information, from the cook. For example, the cook may input the expected cooking time information through an input unit (e.g., a touch screen, or a button) of the kitchen communication device 500. The kitchen communication device 500 may transmit the input expected cooking time information to the serving robot 400.

According to the embodiment, the server 200*a* may automatically obtain the expected cooking time information of the food, which is included in the order information of the customer, based on the order information of other customers obtained before the order information of the customer.

According to an embodiment, the order list may be managed by the serving robot 400. In this case, the above-described operations of the server 200*a* may be performed by the processor 480 of the serving robot 400.

The processor 480 may receive the expected cooking time information from the kitchen communication device 500 or the server 200*a* and may output the received expected cooking time information through the output unit 450, thereby providing the received expected cooking time information to the customer.

According to an embodiment, the expected cooking time information may be transmitted to the table communication device 600 provided in the table of the customer, and the table communication device 600 may output the received expected cooking time information.

Figure 7:
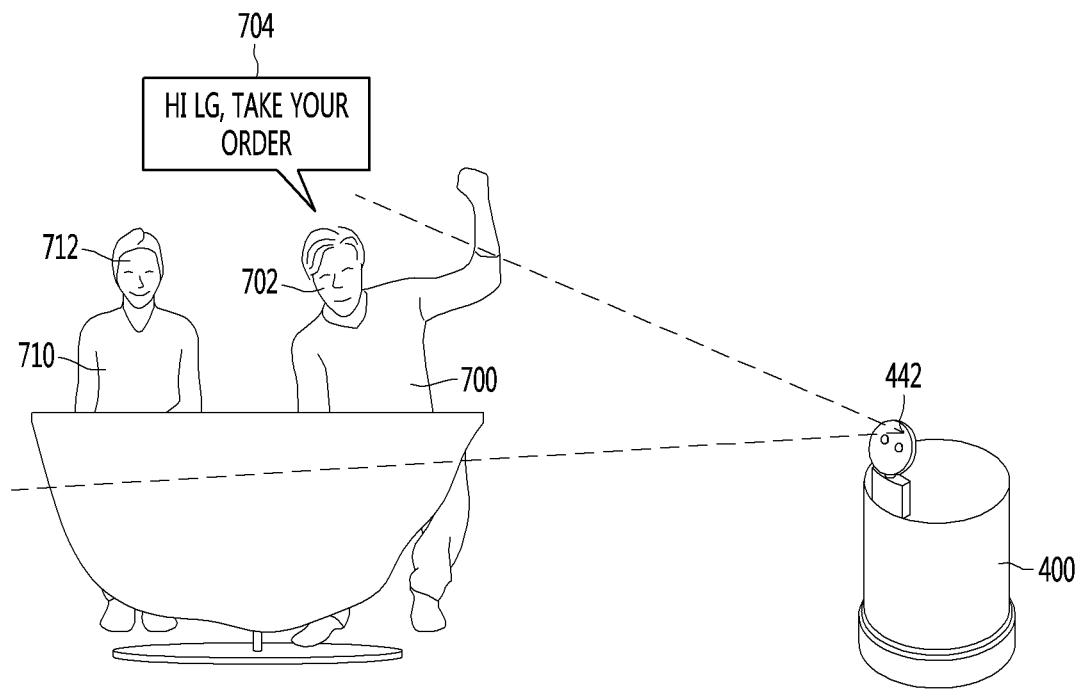
FIGS. 7 to 9 are views illustrating customer receiving operations of the serving robot illustrated in FIG. 6.
Figure 8:
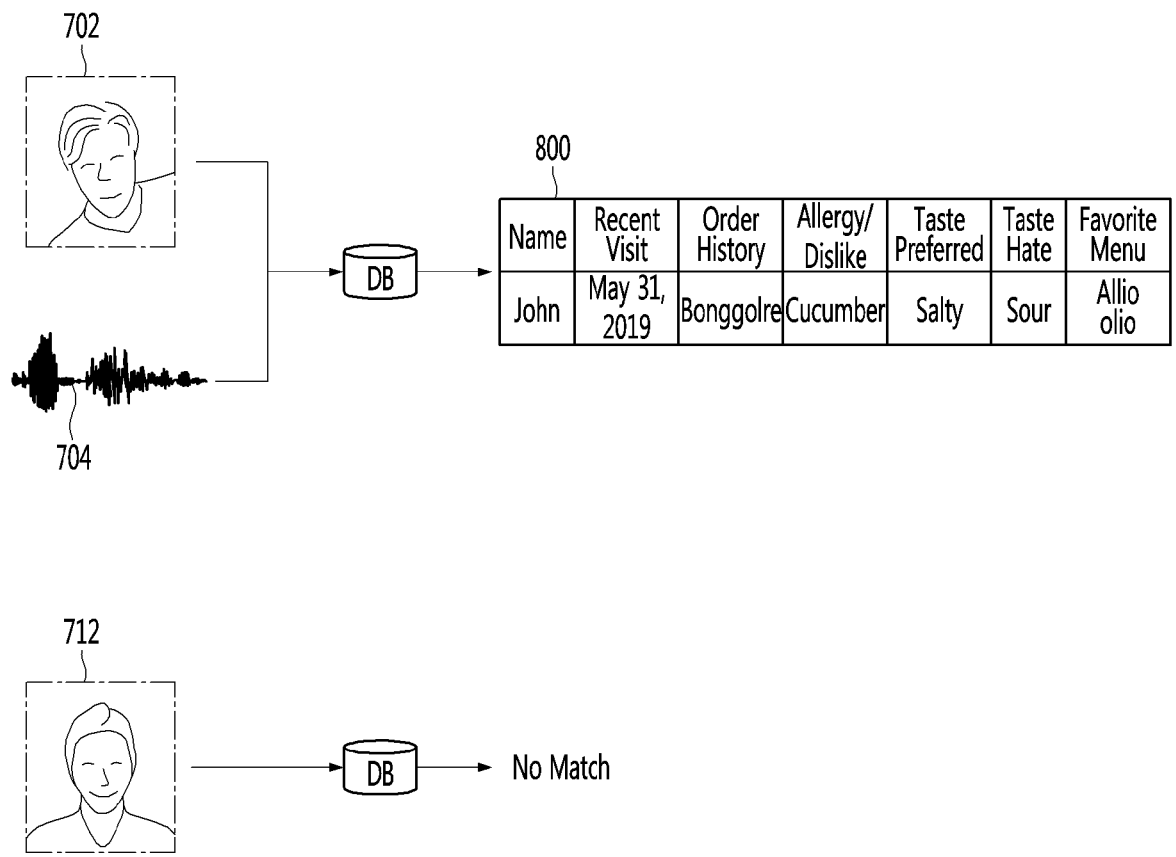
Figure 9:
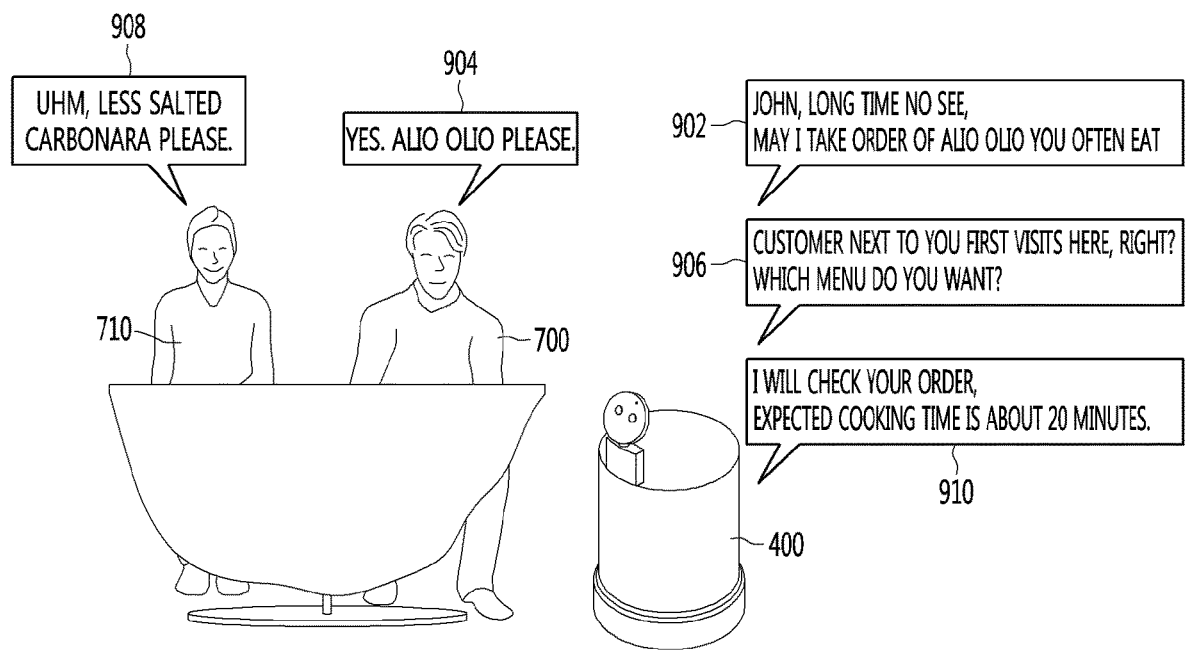

FIGS. 7 to 9 are views illustrating customer receiving operations of the serving robot illustrated in FIG. 6.

The shape of the serving robot 400 illustrated after FIG. 7 is an example for convenience of explanation. The various embodiments described herein are identically or similarly applicable to each of various serving robots, as well as the serving robot 400 having the above shape.

Referring to FIG. 7, a first customer 700 may call the serving robot 400 to order food. For example, the first customer 700 may utter a call voice 704 or show a call gesture. The processor 480 of the serving robot 400 may sense the call voice 704 and/or the call gesture through the microphone 422 and/or the camera 442, and may control the traveling unit 462 to approach the position of the first customer 700.

Meanwhile, the processor 480 may obtain image data including faces 702 and 712 of customers 700 and 710 present in the table of the first customer 700 through the camera 442.

Referring to FIG. 8, the processor 480 may identify each of the customers 700, 710 present in the table.

In detail, the processor 480 may identify the first customer 700 from image data of an area for the face 702 of the first customer 700, which is included in the image data, and/or the call voice 704 of the first customer 700. In addition, the processor 480 may identify the second customer 710 from the image data of an area for the face 712 of the second customer 710, which is included in the image data.

For example, when the feature information or the learned data of the first customer 700 is present in the database or the memory 470, the processor 480 may identify the first customer 700. The processor 480 may obtain customer management information 800 corresponding to the first customer 700 from the database.

Meanwhile, when feature information or learned data of the second customer 710 is absent in the database or the memory 470, the processor 480 may not identify the second customer 710. The processor 480 may recognize that the second customer 710 first visits the shop as the second customer 710 is not identified.

Referring to FIG. 9, the serving robot 400 may obtain order information of the customers 700 and 710 based on the identification results of the customers 700 and 710.

For example, the processor 480 may output, through the speaker 454, an order request message 902 of asking the first customer 700 whether the first customer 700 orders the favorite menu or a recommended menu having a taste similar to a taste of the favorite menu, based on favorite menu information included in customer management information 800 of the first customer 700. The first customer 700 may input order information by uttering an order message 904 based on the order request message 902. In other words, the first customer 700 may recognize that the differentiated service is provided through the message output by the serving robot 400, so the satisfaction of the customer with the shop may be improved.

Meanwhile, the processor 480 may output an order request message 906 to the second customer 710 having no customer management information. According to an embodiment, the order request message 906 may include information on a menu recommended by a shop or a popular menu of the store to provide the convenience of the order by the second customer 710. The second customer 710 may input order information by uttering an order message 908 in response to the order request message 906.

The processor 480 may transmit the obtained order information to the server 200*a* and/or the kitchen communication device 500. In addition, the processor 480 may generate the expected cooking time information corresponding to the order information or receive the expected cooking time information from the server 200*a* or the kitchen communication device 500, and may output a message 910 including the expected cooking time information.

According to an embodiment, the processor 480 may generate or update customer management information based on order information of each of customers 700 and 710.

Meanwhile, some of the operations of the serving robot 400 described with respect to FIGS. 6 to 9 may be performed by the server 200*a*. In general, the processing performance of the server 200a is superior to the processing performance of the serving robot 400, so it is possible to more smoothly and rapidly provide a service. The details thereof will be described below with reference to FIG. 10.

Figure 10:
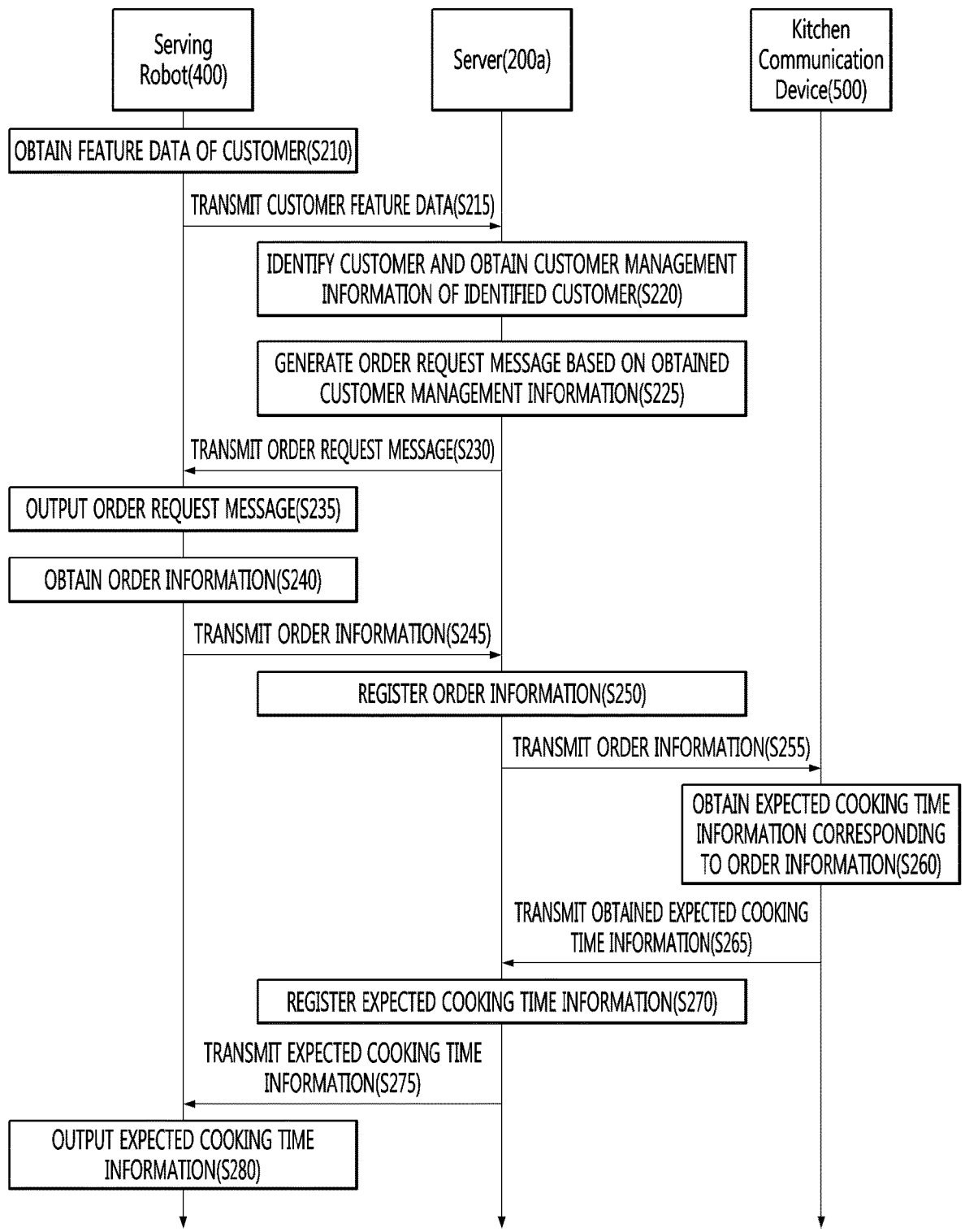
FIG. 10 is a ladder diagram illustrating a customer receiving operation of a serving system according to an embodiment of the present invention.

FIG. 10 is a ladder diagram illustrating an operation of receiving a customer by a serving system according to an embodiment of the present invention.

Referring to FIG. 10, the serving robot 400 may obtain customer feature data (S210) and may transmit the obtained customer feature data to the server 200a (S215).

The processor 480 may control the communication unit 410 to obtain the customer feature data using the camera 442 and/or the microphone 422 and to transmit the obtained customer feature data to the server 200a.

The server 200a may identify the customer based on the received customer feature data and may obtain the customer management information of the identified customer (S220).

The server 200a may identify the customer from the customer feature data in a manner similar to that described above in step S110 of FIG. 6.

If the customer is identified, the server 200a may obtain customer management information corresponding to the identified customer from the database. The database may be included in the server 200a or may be included in a separate database server connected with the server 200a.

The server 200a may generate an order request message based on the obtained customer management information (S225), and may transmit the generated order request message to the serving robot 400 (S230).

Similarly to the description made with reference to FIG. 6, the server 200a may generate the order request message based on at least one piece of information of the order history, the favorite menu, the allergy or dislike food ingredient, the preferred taste, and the hate taste included in the customer management information. For example, the order request message may include information on at least one recommended menu or favorite menu based on the customer management information.

According to the embodiment, the server 200a may generate an order request message in a predefined form, with respect to a customer having no customer management information and may transmit the order request message to the serving robot 400.

The serving robot 400 may output the received order request message (S235), and may obtain order information based on the output order request message from the customer (S240).

The serving robot 400 may transmit the obtained order information to the server 200a (S245), and the server 200a may register the received order information in the order list (S250).

The server 200a may transmit the order information (or an order list including the order information) to the kitchen communication device 500 (S255).

The kitchen communication device 500 may obtain the expected cooking time information corresponding to the received order information (S260), and may transmit the obtained expected cooking time information to the server 200a (S265).

Since the contents associated with steps S245 to step S265 have been described in step S130 of FIG. 6, the further description thereof will be omitted.

The server 200a may register the received expected cooking time information to correspond to the order information included in the order list (S270), and may transmit the expected cooking time information to the serving robot 400 (S275). The serving robot 400 may output the received expected cooking time information (S280).

In other words, the server 200a may effectively manage the order list by registering the expected cooking time information for each of at least one piece of order information, which is included in the order list, in the order list. According to an embodiment, the server 200a transmits information about the order list to the kitchen communication device 500, thereby allowing the cook to conveniently identify the order list.

The server 200a transmits the expected cooking time information to the serving robot 400 and the serving robot 400 outputs the received expected cooking time information to provide the expected cooking time information to the customer.

According to the embodiment, the server 200a may transmit the expected cooking time information to the table communication device 600 corresponding to the customer, and the table communication device 600 may output the received expected cooking time information.

In other words, according to an embodiment illustrated in FIGS. 6 to 10, when the serving robot 400 or the serving system obtains order information from the customer, the serving robot 400 or the serving system may provide a customized service or a differentiated service using the customer management information obtained through the identification of the customer, thereby implementing more intelligent robots and systems. The customer may receive the customized service and the differentiated service from the serving robot 400, so the satisfaction of the customer with the shop may be enhanced.

Figure 11:
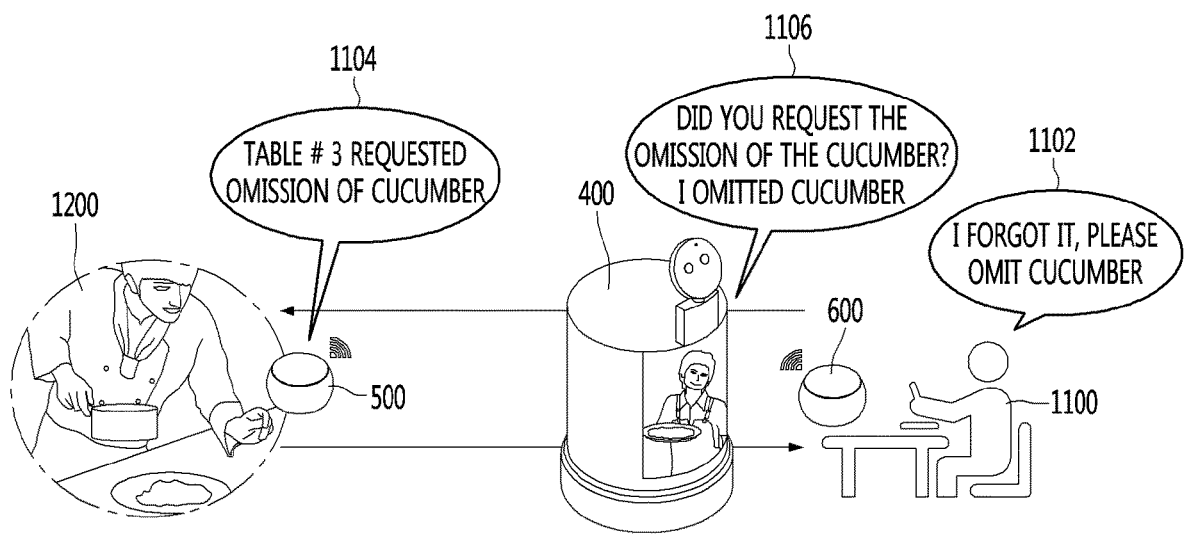
FIG. 11 is a view illustrating that a serving robot or a serving system performs operations of receiving and processing an additional request at a predetermined time point after obtaining order information from a customer.

FIG. 11 is a view illustrating that a serving robot or a serving system performs operations of receiving and processing an additional request at a predetermined time point after obtaining the order information from a customer.

In a specific situation, a customer 1100 may want to send, to a cook 1200, an additional request for food after ordering the food.

In this case, the customer 1100 may call the serving robot 400 through the call voice, the call gesture, or the table communication device 600. The serving robot 400 may sense the call of the customer 1100 and approach the table of the customer.

The serving robot 400 may obtain, through the microphone 422, a voice 1102 including the additional request by the customer 1100. Alternatively, the serving robot 400 may receive the additional request through the input unit 420.

According to an embodiment, when the table communication device 600 includes a microphone, the customer 1100 transmits the voice 1102 including the additional request to the table communication device 600 without calling the serving robot 400.

The serving robot 400 or the table communication device 600 may transmit the obtained additional request to the kitchen communication device 500. The cook may identify the addition request of the customer 1100 through the kitchen communication device 500 and perform a cooking operation in which the addition request is reflected.

According to an embodiment, the serving robot 400 or the table communication device 600 may transmit the obtained voice 1102 to the server 200a. The server 200a may recognize the addition request included in the voice 1102 through a well-known method such as a voice recognition algorithm. The server 200a may transmit information on the recognized additional request to the kitchen communication device 500.

Meanwhile, the kitchen communication device 500 may receive an input including a confirmation or processing result of the addition request from the cook, and may transmit information corresponding to the received input to the table communication device 600 or the serving robot 400.

According to an embodiment, when the additional request is input, the serving robot 400 may activate a remote conversation interface (e.g., a video conversation) with the kitchen communication device 500.

For example, the serving robot 400 may output a video and/or voice 1106 of the cook received from the kitchen communication device 500 through the output unit 450. The serving robot 400 may receive a video and/or voice of the customer 1100 through the camera 442 and/or the microphone 422 and provide the video and/or voice to the kitchen communication device 500. In other words, the serving robot 400 and the kitchen communication device 500 may enable remote communication, such as sending the additional request of the customer 1100 or sending an evaluation of the food, between the customer 1100 and the cook 1200.

Figure 12:
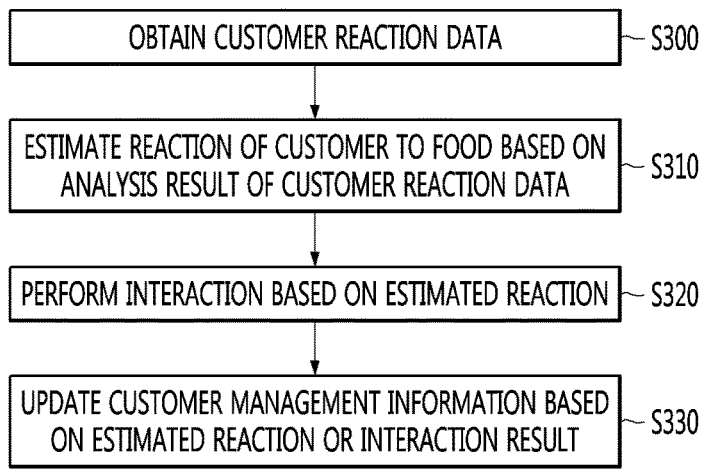
FIG. 12 is a flowchart illustrating a customer receiving operation of a serving robot according to an embodiment of the present invention.

FIG. 12 is a flowchart illustrating a customer receiving operation of a serving robot according to an embodiment of the present invention.

The serving robot 400 according to an embodiment of the present invention may estimate a reaction of the customer to food, or perform an interaction or update customer management information based on the estimated reaction.

Referring to FIG. 12, the serving robot 400 may obtain customer reaction data (S300).

The processor 480 may obtain customer reaction data for the customer during the meal, using the camera 442 and/or the microphone 422. For example, the customer reaction data may include image data including the facial expressions or gesture of the customer, and/or voice data including the voice of the customer.

The serving robot 400 may estimate the reaction of the customer to the food based on the analysis result of the customer reaction data (S310).

The processor 480 may analyze the obtained customer reaction data to estimate the reaction of the customer to the food during meal.

For example, the processor 480 may estimate the emotion of the customer and the reaction of the customer based on the facial expression or gesture of the customer, which is included in the obtained image data. Alternatively, the processor 480 may estimate the reaction of the customer by recognizing the voice of the customer included in the obtained voice data.

According to an embodiment, the processor 480 may estimate the reaction of the customer based on the customer reaction data by using a learning model (artificial neural network) learned by the learning processor 430 or received from the server 200a.

According to an embodiment, the processor 480 may transmit the obtained customer reaction data to the server 200a. The server 200a may estimate the reaction of the customer from the received customer reaction data. The customer reaction estimation method of the server 200a may be similar to the customer reaction estimation method of the processor 480 described above. The server 200a may transmit the estimation result to the serving robot 400 or may transmit the interaction data or the interaction command corresponding to the estimation result to the serving robot 400.

The serving robot 400 may perform an interaction based on the estimated reaction (S320).

The processor 480 may estimate the reaction of each of customers to the food while traveling in the shop or at a predetermined position in the shop.

For example, each of the estimable reactions from the customer may be classified depending on whether an interaction is required. Some of the reactions (e.g., satisfaction, no reaction) may be classified as reactions not to require an interaction of the serving robot 400, and other reactions (e.g., dissatisfaction, anger, or spicy) may be classified as reactions requiring the interaction of the serving robot 400.

If the estimated reaction for a specific customer of the customers is a reaction requiring the interaction, the processor 480 may control the traveling unit 462 to approach the specific customer.

When the serving robot 400 approaches the specific customer, the processor 480 may output a message (e.g., an inquiry message, a guide message) associated with the reaction of the specific customer through the output unit 450. The processor 480 may obtain the voice of the customer based on the output message through the microphone 422. The voice of the customer may include a response to the output message, a request, or an inquiry.

According to the embodiment, when the serving robot 400 approaches the specific customer, the specific customer may utter a voice including a request or an inquiry to the serving robot 400. The processor 480 may obtain the voice through the microphone 422.

The processor 480 may transmit the obtained voice to the server 200a or to the kitchen communication device 500.

When the obtained voice is transmitted to the server 200a, the server 200a recognizes the response of the customer, the request, or the inquiry from the received voice, and transmits a message based on the recognition result to the serving robot 400 or the kitchen communication device 500. The serving robot 400 or the kitchen communication device 500 may output the received message.

Meanwhile, when the obtained voice is transmitted to the kitchen communication device 500, the kitchen communication device 500 may output the received voice through the speaker. The cook present in the kitchen may identify the request of the customer or the inquiry of the customer, based on the output voice and may process the request or input a response to the inquiry. The kitchen communication device 500 may transmit response data including the input response, to the serving robot 400. The serving robot 400 may output the received response data through the output unit 450 to inform that the request of the customer or the dissatisfaction of the customer is processed.

According to the embodiment, the serving robot 400 may update the customer management information based on the estimated reaction or the interaction result (S330).

The processor 480 may update customer management information of a specific customer based on the estimated reaction for the specific customer.

For example, when it is estimated that the reaction of the customer to the food is positive (satisfaction), the processor 480 may register the food in the favorite menu of the customer management information of the customer. Alternatively, the processor 480 may register, in the customer management information, information indicating that the reaction of the customer to the characteristic (taste, or ingredient) of the food is positive.

To the contrary, when it is estimated that the reaction of the customer to the food is negative (unsatisfactory), the processor 480 may register, in the customer management information, information indicating that the reaction of the customer to the characteristics (taste or ingredients) of the food is negative.

In addition, the processor 480 may update the customer management information, based on the interaction performed based on the estimated reaction. For example, the processor 480 may update the customer management information based on the recognition result of the voice of the customer obtained in step S320. Alternatively, the processor 480 may update the customer management information based on the communication result between the customer and the cook.

In other words, according to an embodiment illustrated in FIG. 12, the serving robot 400 may easily detect and manage the taste of the customer by estimating the reaction of the customer during the meal. Accordingly, when the customer visits the shop in the future, a customized or differentiated service may be effectively provided.

In addition, the serving robot 400 may obtain feedback data on foods provided in the shop, by estimating the reactions of the customers. Since the manager of the shop may improve or complement a menu based on the obtained feedback data, the shop may be effectively managed.

The embodiments associated with step S320 to S330 have been described with reference to FIGS. 13 to 14.

Figure 13:
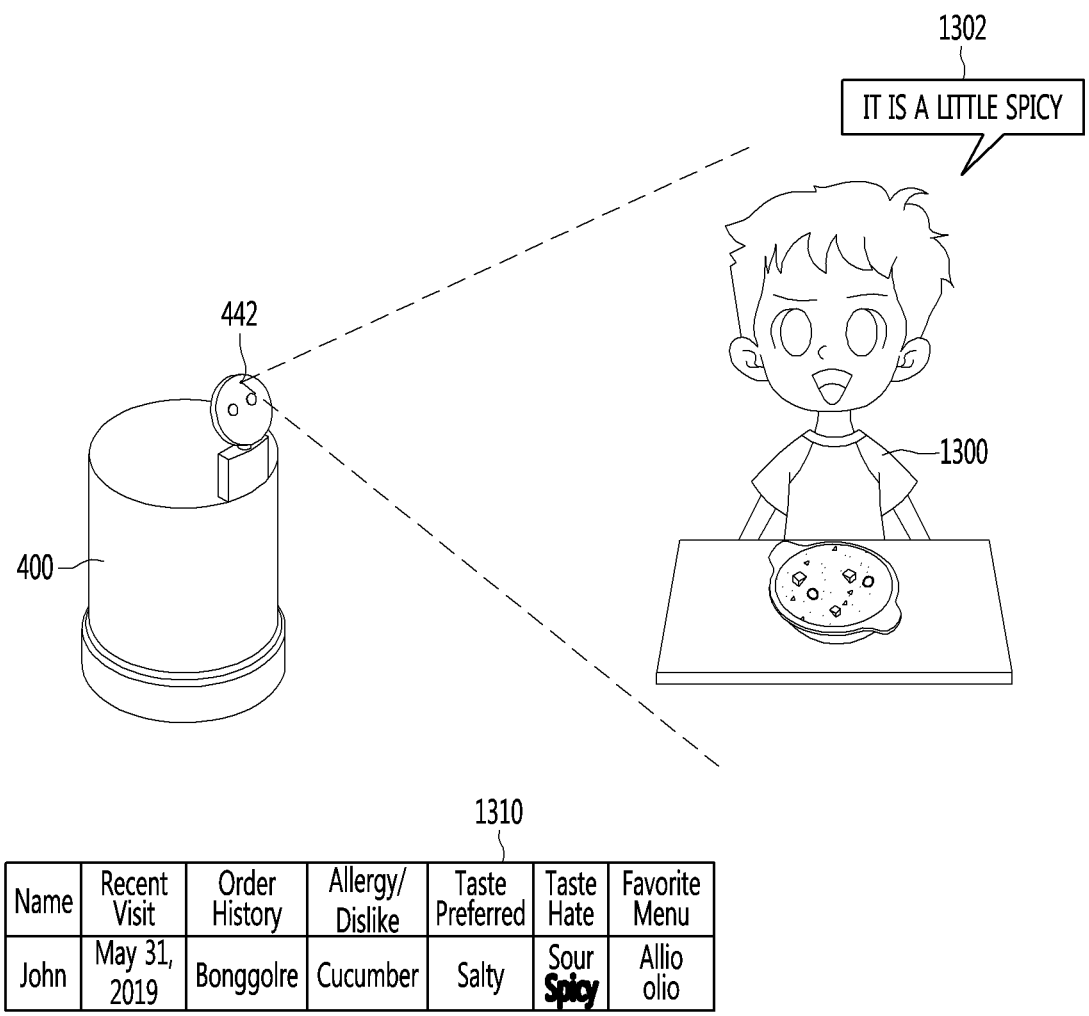
FIGS. 13 to 14 are views associated with a customer receiving operation of a serving robot illustrated in FIG. 12.
Figure 14:
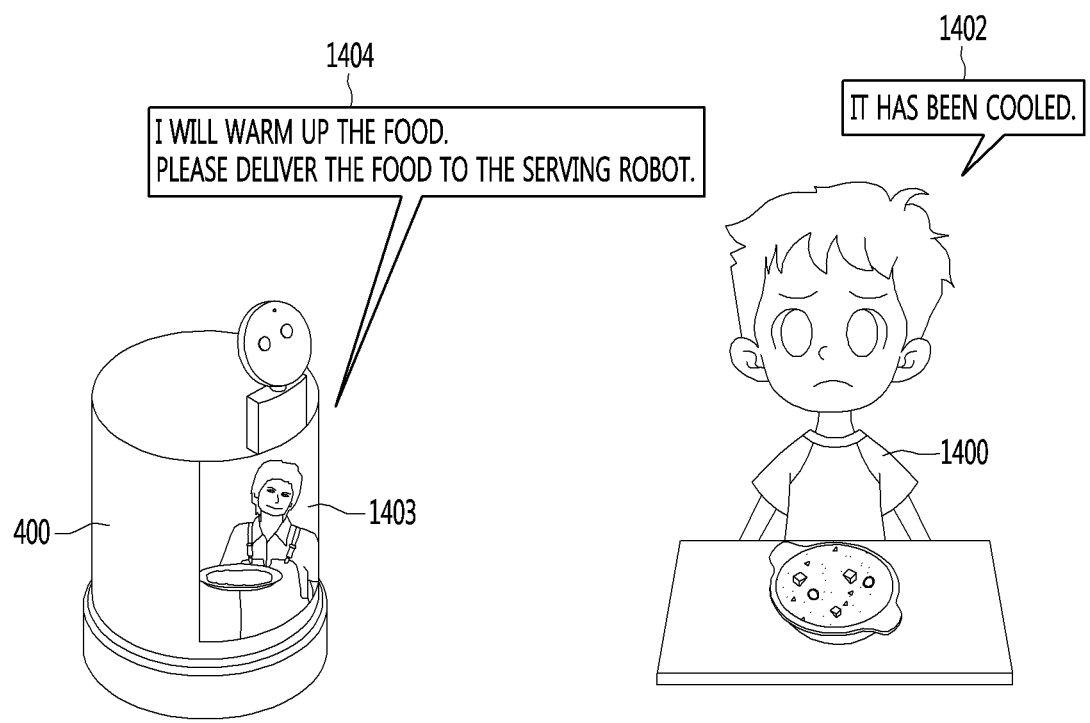

FIGS. 13 to 14 are views associated with the operations of the serving robot illustrated in FIG. 12.

Referring to FIG. 13, a customer 1300 may feel that food for eating is a little spicy. In this case, the customer 1300 may show a facial expression or a gesture representing that the food is spicy, or may utter a voice 1302 representing that the food is spicy.

The processor 480 of the serving robot 400 may obtain image data including the facial expression or the gesture of the customer 1300 through the camera 442. Alternatively, the serving robot 400 may obtain the voice data including the voice 1302 of the customer through the microphone 422.

The processor 480 may estimate that the reaction of the customer 1300 correspond to 'spicy', based on the facial expression or the gesture of the customer 1300 included in the obtained image data or the voice 1302 of the customer 1300 included the obtained voice data. For example, the processor 480 may estimate the reaction of the customer 1300 from the image data and/or voice data using the learning model (artificial neural network) stored in the memory 470.

The processor 480 may update the customer management information 1310 of the customer 1300 based on the estimated reaction. For example, the processor 480 may update the customer management information 1310 by adding information indicating 'spicy' to an item of 'Taste Hate' included in the customer management information 1310.

According to an embodiment, the processor 480 may transmit the obtained image data and/or voice data to the server 200a. The server 200a may estimate the reaction of the customer 1300 from the image data and/or voice data using the learning model learned by the learning processor 230. The server 200a may update the customer management information 1310 of the customer 1300 based on the estimated reaction.

Referring to FIG. 14, a customer 1400 may show a facial expression or a gesture indicating that food for eating has cooled, or may utter a voice 1402 indicating that the food has cooled, when the food has been cooled.

The processor 480 of the serving robot 400 may obtain image data including a facial expression or a gesture of the customer 1400 through the camera 442. Alternatively, the serving robot 400 may obtain the voice data including the voice 1402 of the customer through the microphone 422.

The processor 480 may estimate that the reaction of the customer 1400 corresponds to "food has been cooled", based on the facial expression or the gesture of the customer 1400 included in the obtained image data and/or the voice 1402 of the customer 1400 included in the obtained voice data. For example, the processor 480 may estimate the reaction of the customer 1400, from the image data and/or the voice data by using the learning model (artificial neural network) stored in the memory 1470. According to an embodiment, as described with reference to FIG. 13, the server 200a may estimate the reaction of the customer 1400.

The processor 480 or the server 200a may transmit information corresponding to the estimated reaction to the kitchen communication device 500. Alternatively, the processor 480 may transmit the obtained image data and/or voice data to the kitchen communication device 500.

The cook may identify the reaction of the customer 1400 through the kitchen communication device 500 and input a response based on the identified reaction to the kitchen communication device 500. For example, the kitchen communication device 500 may obtain image data and/or voice data including the response using the camera and/or microphone, and may transmit the obtained data to the serving robot 400.

The processor 480 may output the data, which is received from the kitchen communication device 500, through the output unit 450. The processor 480 may output through the display 452, an image 1403 based on the image data, which is received from the kitchen communication device 500 and may output a voice 1404 based on the voice data through the speaker 454. Accordingly, complaints or requests associated with the food may be solved smoothly, and the satisfaction of the customer 1400 may be improved. In addition, the cook may effectively improve or complement food based on the reactions of customers to the food.

According to the present invention, the serving robot may update customer management information by estimating the reaction of the customer from customer reaction data obtained using the camera or the microphone, thereby easily detecting and managing the taste of the customer using the shop. Accordingly, the serving robot, which is more intelligent, may be implemented to effectively provide a customized and differentiated service to the customer, when the customer visits again thereafter, In addition, the serving robot provides, to the manager of the shop, exact and rich data on foods, which are provided by the shop, by estimating the reaction of the customers, thereby maximizing the satisfaction with the serving robot of the manager.

In addition, when the serving robot obtains the order information from the customer, the customer management information obtained through the identification of the customer is used, thereby actively providing a customized service and a differentiated service.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

What is claimed is:

1. A serving robot comprising:
   a camera to obtain image data including at least one of a facial expression or a gesture, which is associated with food, of a customer;
   a microphone to obtain voice data including voice of the customer, which is associated with the food; and
   a processor configured to:
      obtain customer reaction data including at least one of the image data or the voice data, through at least one of the camera or the microphone;
      estimate a reaction of the customer to the food, from the obtained customer reaction data; and
      generate or update customer management information corresponding to the customer based on the estimated reaction,
   wherein the processor is configured to:
      obtain customer feature data including at least one of image data including a face of the customer or voice data including a voice of the customer, through at least one of the camera or the microphone;
      identify the customer based on the obtained customer feature data;
      obtain, from a database, customer management information corresponding to the identified customer;
      output an order request message having favorite menu information that is included within the customer management information corresponding to the identified customer, when the customer is identified; and
      output an order request message having popular menu information, when the customer is not identified,
   wherein the customer management information includes:
      at least one item of a name of the customer, a visit history or an ordered food history.

2. The serving robot of claim 1, wherein the processor is configured to:
   recognize emotion of the customer based on the at least one of the facial expression or the gesture of the customer included in the image data; and
   estimate the reaction of the customer to the food, based on the recognized emotion.

3. The serving robot of claim 1, further comprising:
   a memory to store a learning model learned by a learning processor,
   wherein the processor is configured to:
      estimate the reaction of the customer from the customer reaction data, through the learning model stored in the memory.

4. The serving robot of claim 1, further comprising:
   a communication unit to connect with a server,
   wherein the processor is configured to:
      control the communication unit to transmit the customer reaction data to the server; and
      receive, from the server, information on the reaction of the customer based on the customer reaction data.

5. The serving robot of claim 1, further comprising:
   a communication unit to connect with a kitchen communication device disposed in a kitchen,
   wherein the processor is configured to:
      control the communication unit to transmit at least one of the customer reaction data, information on the estimated reaction, or voice data including a request or an inquiry associated with food, which is obtained from the customer, to the kitchen communication device.

6. The serving robot of claim 5, further comprising:
   at least one of a display and a speaker,
   wherein the processor is configured to:
      receive response data including at least one of image data or voice data from the kitchen communication device; and
      control at least one of the display and the speaker to output the received response data.

7. The serving robot of claim 1, wherein the customer management information further includes:
   at least one item of allergy or dislike food ingredient, preferred taste, hate taste, or a favorite food menu.

8. The serving robot of claim 7, wherein the processor is configured to:
   update at least one of the allergy or dislike food ingredient, the preferred taste, the hate taste, or the favorite food menu, which is the item of the customer management information, based on the estimated reaction.

9. The serving robot of claim 1, further comprising:
   a communication unit to connect with at least one of a server or a kitchen communication device,
   wherein the processor is configured to:
      obtain order information from the customer, based on the customer management information; and
      transmit the obtained order information to the server or the kitchen communication device.

10. The serving robot of claim 9, wherein the processor is configured to:
    receive expected cooking time information for the order information from the server or the kitchen communication device; and
    output the received expected cooking time information through at least one of a display or a speaker.

11. The serving robot of claim 9, wherein the processor is configured to:
    register the order information from the customer in an order list including order information of at least one of another customer;
    generate expected cooking time information for the order information, based on the order list; and
    output the generated expected cooking time information through at least one of a display or a speaker.

12. A method for receiving a customer using a serving robot, the method comprising:
    obtaining customer reaction data associated with food;
    estimating a reaction of the customer to the food, from the obtained customer reaction data; and
    updating customer management information corresponding to the customer based on the estimated reaction,
    wherein the customer reaction data includes:
       at least one of image data including at least one of a facial expression or a gesture, which is associated with the food, of the customer, or voice data including a voice of the customer, which is associated with the food,
    wherein the method further comprises:
       identifying the customer based on at least one of image data including a face of the customer or voice data including a voice of the customer;

obtaining, from a database, customer management information that corresponds to the identified customer;

outputting an order request message having favorite menu information that is included within the customer management information corresponding to the identified customer, when the customer is identified; and outputting an order request message having popular menu information, when the customer is not identified, wherein the customer management information includes:

information on at least one item of a name of the customer, a visit history, or an ordered food history.

13. The method of claim 12, wherein the estimating of the reaction of the customer to the food includes:

recognizing emotion of the customer based on the at least one of the facial expression or the gesture of the customer included in the image data; and estimating the reaction of the customer to the food, based on the recognized emotion.

14. The method of claim 12, further comprising:

transmitting at least one of the customer reaction data, information on the estimated reaction, or voice data including a request or an inquiry associated with the food, which is obtained from the customer, to a kitchen communication device connected with the serving robot.

15. The method of claim 14, further comprising:

receiving response data including at least one of image data or voice data from the kitchen communication device; and outputting the received response data through the serving robot or a table communication device corresponding to a table of the customer.

16. The method of claim 12, wherein the customer management information includes:

information on at least one item of allergy or dislike food ingredient, preferred taste, hate taste, or a favorite menu, and wherein the updating of the customer management information includes:

updating information on at least one item of the allergy or dislike food ingredient, the preferred taste, the hate taste, or the favorite menu, based on the estimated reaction.

17. The method of claim 12, further comprising:

obtaining order information from the customer based on the customer management information; and transmitting the obtained order information to a server or a kitchen communication device connected with the serving robot.

18. The method of claim 17, further comprising:

receiving expected cooking time information for the order information from the server or the kitchen communication device; and outputting the received expected cooking time information through the serving robot or a table communication device corresponding to a table of the customer.

* * * * *